United States Patent Office 3,563,783
Patented Feb. 16, 1971

3,563,783
NON-ELECTROLYTIC PLATING OF THE THERMO-PLASTIC RESIN ARTICLES
Toramitsu Sukuma, Osaka-fu, Japan, assignor to Sumitomo Naugatuck and Company, Ltd., Osaka, Japan, a corporation of Japan
No Drawing. Filed Feb. 1, 1968, Ser. No. 702,210
Int. Cl. B44d 1/092; C23c 3/00
U.S. Cl. 117—47                                        14 Claims

ABSTRACT OF THE DISCLOSURE

Mixing of an alkaline earth metal sulfide (e.g. calcium sulfide, barium sulfide) with a thermoplastic resin (e.g. ABS resin), prior to shaping and non-electrolytic plating, results in improved adhesion of the plating.

BACKGROUND OF THE INVENTION (1) Field of the invention

The invention relates to non-electrolytic plating of plastics and to resulting non-electrolytic plated articles.

(2) Description of the prior art

It has been known that ABS resin (a ternary copolymeric thermoplastic resin composition consisting of acrylonitrile, butadiene and styrene) is an excellent resin on which to apply non-electrolytic plating. It has been general practice for increasing plate adhesion to mechanically roughen the surface of a resin molding or to apply a strong oxidation treatment on the surface with nitric acid or hydrofluoric acid, etc. prior to nonelectrolytic plating. However, such a pretreatment sometimes excessively degrades the smoothness of the surface of the molding or causes quality changes of the resin itself which leads to poorer plate adhesion. Another proposed method has been to carry out molding and plating after mixing ABS resin with an inorganic additive such as, for example, titanium dioxide and glass powder in order for the resin molding to withstand the aforesaid strong surface oxidation treatment and thus to avoid quality change and deformation. Although this method has the effect of reinforcing the resin, the plate adhesion decreases all the more as compared with the case of no additives because the surface oxidation becomes insufficient due to the addition of the additives. Besides, the addition constitutes a cause of poorer flow and processability.

The present inventor discovered that, by addition of a sulfide of an alkaline earth metal to a thermoplastic resin, the adhesion of the plated layer to said thermoplastic resin could be greatly improved.

Therefore, an object of the present invention is to provide a plating method for thermoplastic resins which results in good adhesion of the plated layer.

Another object of the present invention is to provide a thermoplastic resin molding with good workability and excellent mechanical properties.

Still another object of the present invention is to provide a plating method by which a high degree of plate adhesion, high enough to withstand industrial uses, is given to an injection molded as well as to a compression molded product.

I am also aware of U.S. Pat. 3,352,820, C. V. Bawn, Nov. 14, 1967, which discloses an ABS composition containing antioxidant or a mixture of antioxidants and, as a stabilizer against heat aging, a sulfide of certain of the metals selected from Group II of the Periodic Table, i.e., beryllium, magnesium, calcium, zinc, strontium, cadmium, or barium, but there is no teaching in this patent of using any of the compositions in a non-electrolytic plating process, and the teaching of the patent has no bearing on the problem to which the present invention is directed.

SUMMARY OF THE INVENTION

The present invention relates to a plating method for thermoplastic resins which is characterized in that the resin is mixed with a sulfide of an alkaline earth metal and molded and thereafter plated non-electrolytically.

DESCRIPTION OF THE PREFERRED EMBODIMENTS

The method of the invention is applicable to conventional organic plastics, including a wide range of thermoplastic resins such as, for example, ABS, acrylonitrile-styrene copolymer, polyethylene, polystyrene, polypropylene, polyvinyl chloride, polyvinyl acetate, and like vinyl resins. Particularly good results are obtained when it is applied to resins having unsaturated radicals such as ABS resin, etc., notably copolymers of such dienes as butadiene-1,3, isoprene, 2,3-dimethylbutadiene-1,3, pentadiene or similar conjugated diolefins (containing, for example, 5–40% of combined diene, the remainder of the copolymer being derived from any suitable copolymerizable monoethylenically unsaturated monomer or monomers such as styrene, alpha-methyl styrene, vinyltoluene, chlorostyrene, alkyoxystyrene, vinylpyridine, alkenyl cyanides such as acrylonitrile, methacrylonitrile, chloroacrylonitrile, acrylic or methacrylic esters in which the ester radical is for example methyl, ethyl, n-propyl, isopropyl, n-butyl, isobutyl, etc.).

The ABS resin may be either of the graft copolymer type (e.g. graft copolymer of acrylonitrile and styrene on polybutadiene or butadiene-styrene copolymer), or it may be of the polyblend type (e.g. blend of styrene-acrylonitrile resin with butadiene-acrylonitrile rubber), or it may be a combination of the two (e.g. blend of the said graft copolymer with separately prepared styrene-acrylonitrile resin). Some or all of the acrylonitrile and/or styrene may be replaced by equivalent materials such as methacrylonitrile, acrylic esters (e.g. methyl methacrylate, ethyl acrylate), alphamethyl styrene, dichlorostyrene, etc. Also suitable are the so-called ABSM resins such as a graft polymer obtained by graft polymerization of monomeric mixture of styrene, acrylonitrile and methyl methacrylate on polybutadiene or a copolymer of butadiene and styrene and a graft polymer obtained by graft polymerization of an admixture of styrene and acrylonitrile on a copolymer of butadiene and methyl methacrylate (including, of course, those polymers in which styrene in the said polymers is substituted with alpha-methyl styrene, and also including the mixtures of the foregoing graft polymer with a two or three component polymer prepared from styrene, acrylonitrile and methyl methacrylate). Also suitable are MBS resins having as constituents, butadiene, styrene and methyl methacrylate and excluding the acrylonitrile of said ABSM resins.

The alkaline earth metal sulfides employed in the invention are magnesium sulfide, calcium sulfide, strontium sulfide and barium sulfide.

If a sulfur additive other than the afore-cited sulfides is incorporated with a thermoplastic resin, such as one containing a 1,3-butadiene type hydrocarbon, the excellent plated molding obtainable under the present invention cannot be realized. For example, when sulfur powder of about 200 mesh particle size is added, although it increases the resistance of the plated metal against peeling, it lacks in practicality in that, because of the presence of residual dodecyl mercaptan used as a polymerization regulator in the resin, the sulfur powder causes crosslinking of the resin to take place and consequently deteriorates the flow and processability. When a sulfur containing organic compound such as thiourea, 2-mercaptobenzothiazole, thioglycol, thioglycolic acid, dodecyl mercaptan, or eterathiuram sulfide is ued, it increases plate adhesion, but such a sulfur-containing organic compound is not desirable because it dissolves out into the plating solution and disturbs the reductive action of the chemical copper solution even if it is used in an amount less than 0.001%. In the chemical nickel solution, said sulfur-containing organic compound interferes much more and the reductive reaction does not proceed at all.

When an alkaline sulfide such as potassium sulfide, sodium sulfide or ammonium sulfide is used, it acclerates the decomposition of the chemical copper and chemical nickel solutions and reduces the plated adhesion. Further, a sulfide of a heavy metal such as zinc sulfide, tin sulfide, lead sulfide, chromium sulfide, iron sulfide, nickel sulfide, etc. is not desirable in that it separates out with the copper or nickel during the plating process and exerts bad effects upon the properties of the plated product. Moreover, the heavy metal sulfide is inferior in lubricating function to that shown by a sulfide of an alkaline earth metal such as calcium sulfide.

Under the present invention, the sulfide of an alkaline earth metal to be added to the thermoplastic resin containing a 1,3-butadiene type hydrocarbon is used in the form of fine powder, preferably of smaller than 100 mesh, more preferably 200 mesh or smaller. The amount to be added is preferably 0.05 to 40 parts by weight per 100 parts by weight of the resin.

A preferable method of incorporating the sulfide of an alkaline earth metal with the thermoplastic resin is to mix for at least three minutes in equipment such as a supermixer (e.g., a Kawada mixer of Japanese manufacture or a Henschel mixer which is widely used in the United States) whose agitator rotates at a high rate of speed accompanied by generation of heat to attain a temperature of more than 100° C. (but not in excess of the thermal degradation temperature of the composition) and to work the mixture thoroughly thereafter with a roll mill or extruder before molding. However, the other well-known methods for mixing are, of course, applicable. Further, appropriate ingredients other than a sulfide of an alkaline earth metal, such as stabilizer, pigment and filler, may be incorporated additionally into the thermoplastic resin.

As the examples hereinafter set forth will illustrate, the sulfide of an alkaline earth metal used in the invention greatly improves the plate adhesion. Particularly it minimizes the variation and decrease in the plate adhesion occurring due to any defects of the injection molding such as residual stress, orientation and uneven distribution of the composition, and provides plate adhesion strong enough to withstand the severe conditions of industrial use.

Further, by using the method of the invention, it is possible to impart the most suitable properties to the surface of a molding for plating with chemical copper as well as chemical nickel, or other metals. In addition, the sulfide of an alkaline earth metal used in accordance with the invention presents a lubricant effect and thus has an added advantage of improving the flow and processability of the resin with a small amount of additive.

The non-electrolytic plating may be followed by the usual electroplating by conventional methods. The metals which may be plated include copper, nickel, chromium, tin, aluminum, silver and gold, in various combinations of successive layers if desired.

The invention is illustrated, but in no way limited, by the following examples, in which all quantities are expressed by weight unless otherwise indicated.

EXAMPLE 1

A powder composition consisting of 55 parts of a graft copolymer prepared by graft polymerization of 50 parts of styrene and acrylonitrile (weight proportion, 70/30) on parts of polybutadiene rubber and 45 parts of a separately prepared resinous copolymer of styrene and acrylonitrile (weight proportion, 70/30) is mixed with 2 parts by weight of fine powder form calcium stearate of smaller than 100 mesh as a lubricant and further with other various additives (shown in the tables below) in amount of 0.5 part by weight each (particle size smaller than 100 mesh, preferably less than 200 mesh). The mixed powder thus obtained is treated in a supermixer for 10 minutes after a temperature of 120° C. is attained and is then extruded into pellets by an extruder at a stock temperature of 200° C. The pellets may be dried at a constant temperature of 80° C. for 2 hours. Then the flow and processability are measured by a Kohka type flow tester (described in an English language book published by Maruzen (Japan) in 1958 titled "A Guide to the Testing of Rheological Properties with the Kohka Flow Tester" by T. Arai) under a load of 100 kilograms per cubic centimeter and at a resin temperature of 210° C. The flow rate of the resin out of a nozzle with a diameter of 1 millimeter is recorded. Other similar melt index or flow index determination methods may be used such as ASTM D1238–57T, D1430–58T, or D1248–58T, but the Kohka tester has the advantage of being able to be run at actual processing (e.g. injection molding) temperature.

Next, the pellets may be compression molded at a stock temperature of 170° C. and under a compression pressure which is gradually raised to a final pressure of 100 kilograms per square centimeter which conditions are maintained for 10 minutes. The flat plates obtained may be cut into test specimens of 0.5 square decimeter each.

Injection molded specimens are also prepared. Using a screw type injection molding machine, the aforementioned pellets are molded at a stock temperature of 250° C., a mold temperature of 70° C., an injection speed of 15 millimeters per second, an injection pressure of 636 kilograms per square centimeter and a cycle time of 60 seconds, into test specimens each having a total surface area of 0.5 square decimeter.

These test specimens are then subjected to an ordinary non-electrolytic plating treatment. They are first dipped for 15 minutes in a chromic acid-sulfuric acid mixed solution, containing sulfuric acid in an amount of 50 percent by weight and 50 g./liter of chromic acid, during which time the solution is heated to 60°–70° C. (see my copending application Ser. No. 695,843, filed Jan. 5, 1967, entitled "Treatment of Resin Surfaces Prior to Non-Electrolytic Plating" for a more detailed disclosure of the make-up of the oxidizing acid bath). After washing with water, they are dipped in a dilute hydrochloric acid solution of stannous chloride (50 g. stannous chloride and 20 g. hydrochloric acid/liter of water) for about 5 minutes, then in a dilute hydrochloric acid solution of palladium chloride (0.1 g. palladium chloride and 0.1 g. hydrochloric acid/liter of water) for about 30 seconds and washed with water. Thereafter, they are dipped in a solution of chemical copper for 15 minutes to form a layer of chemical copper thereon with a thickness of about 0.3 micron. The chemical copper solution may be made up as follows:

|  | G./l. |
|---|---|
| $CuSo_4 \cdot 5H_2O$ | 35 |
| $NiCl_2 \cdot 6H_2O$ | 8 |
| Formaldehyde (37%) | 100 |
| Rochelle salt (aqueous) | 150 |
| NaOH (go give pH about 13) ca. | 40 |
| Thiourea (stabilizer) | 0.001 |

The specimens are then dipped in dilute sulfuric acid for a little over 10 seconds, and immediately plated with electrolytic copper to a thickness of about 40 microns in an ordinary acidic copper sulfate plating bath. The copper sulfate bath suitably may have the following composition:

| $CuSO_4 \cdot 5H_2O$ | g./l. 300 |
|---|---|
| $H_2SO_4(98\%)$ | cc./l. (73 g.) 40 |

The bath may have a pH of about 1.4 and a specific gravity of about 1.3 at room tempearture. The solution may further contain conventional commercially available additives, such as 20 cc./l. of UBAC, supplied by Udylite Co. The current density may be 5 amp./dm.$^2$, maintained for 90 minutes. The electrode may be electrolytic copper. The plated moldings are then electroplated with nickel, thickness 10 microns, in conventional manner using for example a bath of the foregoing kind:

|  | G./l. |
|---|---|
| $NiSO_4 \cdot 7H_2O$ | 260 |
| $NiCl_2 \cdot 6H_2O$ | 45 |
| $H_3BO_4$ | 40 |

The pH may be about 5.0, the specific gravity 1.24, current density 3 amps./dm.$^2$ (45° C.). The solution may further contain a small amount of a conventional gloss agent such as Udylite 66. Next, chromium in about 0.2 micron thickness is electroplated, for example from the following bath:

| $CrO_3$ | g./l. | 250 |
|---|---|---|
| $H_2SO_4$ | cc./l. | 2.5 |
| $Cr_2O_3$ | g./l. | 5 |

The current density may be 20 amps./dm.$^2$ (50° C.).

The plated moldings thus obtained are tested for peel strength and for resistance against heating and cooling.

The peel strength may be tested in the following manner. Two rectilinear scratches are cut on the plated surface at a spacing of 10 millimeters. Using an Instron tester, the plated layer is pulled along the scratches at an angle of 90 degrees and a speed of 100 millimeters per minute, and the force required for peeling is read on the scale of the Instron tester.

The heating and cooling test comprises repetition of a cycle of heating at 80° C. for 8 hours, standing at room temperature for 30 minutes, cooling at −30° C. for 7 hours and standing at room temperature for 30 minutes. The number of cycles during which no swelling or peeling is observed on the plated surface determines the degree of resistance to environmental conditions. The results are shown in Table 1.

TABLE 1

| | | Peel strength (g./cm.) | | Heating and cooling test (cycles to failure) | |
|---|---|---|---|---|---|
| Additive | Flow rate (cc./min.) | Compression moldings | Injection moldings | Compression moldings | Injection moldings |
| Example: | | | | | |
| Calcium sulfide | 4.5–4.3 | 6,000 | 1,800–1,900 | >10 | >10 |
| Control: | | | | | |
| Anatase type titanium white | 2.3–2.1 | 4,000 | 1,200–1,400 | >10 | 9 |
| None | 3.5–3.4 | 2,500 | 550–700 | >10 | 1 |

As can be seen in Table 1, the moldings containing a sulfide of an alkaline earth metal, calcium sulfide, as an additive (example), are surprisingly greatly improved in peel strength and in the heating and cooling tests as compared with the specimens listed as controls.

EXAMPLE 2

To 100 parts by weight of the powder of thermoplastic resin composition used in Example 1 are added and mixed, as a lubricant, ethylene-bis-stearamide in an amount of 3 parts by weight and various additives each in an amount of 0.5 part by weight. Similarly to Example 1, the flow and processability are measured and test specimens are both compression molded and injection molded. The test specimens are subjected to non-electrolytic plating treatment in a manner similar to that in Example 1 but treated with chemical nickel instead of chemical copper as in Example 1. That is, the test specimens are first dipped in a dilute hydrochloric acid solution of palladium chloride and then in a slightly acidic, aqueous solution having a nickel ion concentration of 0.5 percent by weight and a pH value of 5.5 (this aqueous solution contains sodium citrate as a complex forming agent and sodium hypophosphite as a reducing agent each in slightly excess of equimolar amount against the amount of nickel salt) at 60° C. for about 5 minutes resulting in a non-electrolytic nickel layer adhered to a thickness of about 0.3 micron. The composition of the bath may be as follows:

|  | G./l. |
|---|---|
| $NiSO_4 \cdot 7H_2O$ | 40 |
| Sodium citrate | 24 |
| Sodium hypophosphite | 20 |
| Sodium acetate | 14 |
| Ammonium chloride | 5 |

Thereafter, electrolytic plating is carried out in an acidic bath of copper as in Example 1.

The peel tests of the thus plated moldings are carried out in the same manner as in Example 1, with the results shown in Table 2.

TABLE 2

| | | Peel strength (g./cm.) | |
|---|---|---|---|
| Additive | Flow rate (cc./min.) | Compression moldings | Injection moldings |
| Example: | | | |
| Calcium sulfide | 6.2–6.1 | 6,200 | 1,700–1,800 |
| Barium sulfide | 3.8–5.4 | 5,400 | 1,400–1,500 |
| Control: | | | |
| None | 6.0–5.5 | 2,000 | 550–650 |
| Zinc sulfide | 5.4–5.3 | 3,200 | 700–900 |
| Titanium white, rutile type | 4.0–3.8 | 4,100 | 700–800 |
| Titanium white, anatase type | 3.6–3.5 | 3,800 | 650–750 |
| Sulfur powder | 1.9–1.7 | 9,000 | (1) |
| Asbestos | 2.2–2.0 | 2,200 | 650–700 |

$^1$ Difficult to mold completely.

EXAMPLE 3

100 parts by weight of a resin powder of a quaternary copolymer of acrylonitrile, butadiene, styrene and methyl methacrylate (weight proportion, 20/10/50/20), 2 parts by weight of stearic acid as a lubricant and various additives each in 0.5 part by weight were mixed, and molding, treatment and testing similar to those of Example 1 were carried out, with the results shown in Table 3.

TABLE 3

| | | Peel strength (g./cm.) | | Heating and cooling test (cycles to failure) | |
|---|---|---|---|---|---|
| Additive | Flow rate (cc./min.) | Compression moldings | Injection moldings | Compression moldings | Injection moldings |
| Example: | | | | | |
| Calcium sulfide | 4.2 | 5,800 | 1,100–1,000 | >10 | >10 |
| Control: | | | | | |
| Titanium white, rutile type | 2.6 | 4,200 | 900–800 | >10 | 6 |
| None | 3.3 | 1,800 | 500–550 | >10 | 0 |

EXAMPLE 4

Using a resin powder of a ternary copolymer of methyl methacrylate, butadiene and styrene (weight proportion, 35/20/45) in place of the resin composition used in previous examples, the flow and processability and the peel strength were tested in the same manner as in Example 1, with the results shown in Table 4.

TABLE 4

| Additive | Flow rate (cc./min.) | Peel strength (g./cm.) | |
|---|---|---|---|
| | | Compression moldings | Injection moldings |
| Example: | | | |
| Calicum sulfide | 5.2 | 1,800 | 700-800 |
| Control: | | | |
| Titanium white, rutile type | 2.8 | 1,200 | 600-700 |
| None | 4.3 | 900 | 250-350 |

Having thus described my invention, what I claim and desire to protect by Letters Patent is:

1. In a method of making a non-electrolytically plated shaped thermoplastic resin article wherein the thermoplastic resin is shaped, subjected to oxidizing acid treatment, sensitized, and thereafter non-electrolytically metal plated, the improvement comprising:
   mixing the thermoplastic resin, prior to shaping, with an alkaline earth metal sulfide.

2. A method as in claim 1, in which the thermoplastic resin is an unsaturated copolymer of butadiene.

3. A method as in claim 1, in which the thermoplastic resin is an acrylonitrile-butadiene-styrene copolymeric resin composition.

4. A method as in claim 1, in which the thermoplastic resin is an acrylonitrile-butadiene-styrene-methyl methacrylate copolymeric resin composition.

5. A method as in claim 1, in which the thermoplastic resin is a methyl methacrylate-butadiene-styrene copolymeric resin composition.

6. A method as in claim 1, in which, subsequent to said shaping and prior to said non-electrolytic plating, the article is immersed in an oxidizing solution comprising chromic acid and sulfuric acid.

7. A method as in claim 1, in which the alkaline earth metal sulfide is added as a powder of smaller particle size than 100 mesh.

8. A method as in claim 1, in which the alkaline earth metal sulfide is added as a powder of smaller particle size than 200 mesh.

9. A method as in claim 1, in which the alkaline earth metal sulfide amounts to 0.05 to 40 parts by weight per 100 parts by weight of the resin.

10. A method as in claim 1, in which a temperature of more than 100° C. is reached during the mixing of the alkaline earth metal sulfide and resin.

11. A method as in claim 1, in which the alkaline earth metal sulfide is calcium sulfide.

12. A method as in claim 1, in which the alkaline earth metal sulfide is barium sulfide.

13. A method as in claim 1, in which the non-electrolytically electrolytic plated article is subsequently electroplated.

14. A shaped article comprising a blend of a thermoplastic resin and an alkaline earth metal sulfide, having an oxidized, sensitized surface which is non-electrolytically metal plated.

References Cited

UNITED STATES PATENTS

| 3,443,988 | 5/1969 | McCormack | 117—160 |
| 3,462,389 | 8/1969 | Schulde et al. | 106—293 |

FOREIGN PATENTS

| 196,063 | 4/1923 | Great Britain | 204—30UX |

ALFRED L. LEAVITT, Primary Examiner

J. A. BELL, Assistant Examiner

U.S. Cl. X.R.

117—160; 204—30